United States Patent
Virr et al.

(10) Patent No.: US 10,188,880 B2
(45) Date of Patent: Jan. 29, 2019

(54) FILTER ASSEMBLY FOR A BREATHING APPARATUS

(71) Applicant: Paftec Technologies Pty Ltd, Artarmon (AU)

(72) Inventors: Alexander Virr, Balmain (AU); Xiaoyi Fu, Epping (AU); Dan Kao, Northbridge (AU); John Michael Snow, Killarney Heights (AU); Damian Charles Johnson, Fairlight (AU)

(73) Assignee: Cleanspace IP Pty Ltd, Artarmon (AU)

( * ) Notice: Subject to any disclaimer, the term of this patent is extended or adjusted under 35 U.S.C. 154(b) by 0 days.

(21) Appl. No.: 15/543,668

(22) PCT Filed: Jan. 14, 2016

(86) PCT No.: PCT/AU2016/050014
§ 371 (c)(1),
(2) Date: Jul. 14, 2017

(87) PCT Pub. No.: WO2016/112433
PCT Pub. Date: Jul. 21, 2016

(65) Prior Publication Data
US 2018/0001120 A1 Jan. 4, 2018

(30) Foreign Application Priority Data
Jan. 14, 2015 (AU) ................................. 2015900095

(51) Int. Cl.
*A62B 23/02* (2006.01)
*A62B 18/00* (2006.01)
(Continued)

(52) U.S. Cl.
CPC .......... *A62B 23/025* (2013.01); *A62B 18/006* (2013.01); *A62B 18/025* (2013.01);
(Continued)

(58) Field of Classification Search
None
See application file for complete search history.

(56) References Cited

U.S. PATENT DOCUMENTS 5,413,097 A * 5/1995 Birenheide .............. A62B 7/10
128/202.22
2011/0283884 A1* 11/2011 Larsen .............. A61M 16/0808
95/25
(Continued)

FOREIGN PATENT DOCUMENTS

CN 103446683 12/2013
KR 20-2010-0002998 9/2011
(Continued)

OTHER PUBLICATIONS

Written Opinion of Application No. PCT/AU2016/050014 by Australian Patent Office, dated Feb. 23, 2016.
(Continued)

*Primary Examiner* — Rachel T Sippel
(74) *Attorney, Agent, or Firm* — Cooper & Dunham LLP

(57) ABSTRACT

A filter assembly for a breathing apparatus, such as a powered air purifying respirator. The filter assembly includes a frame for receiving and retaining a filter element, a cover connected to the frame and dimensioned to cover the aperture, a filter element, and an indicator for indicating when the filter element is retained in the filter frame and the cover is arranged across the aperture. A powered breathing apparatus including the filter assembly is also disclosed.

15 Claims, 4 Drawing Sheets

(51) Int. Cl.
*A62B 18/02* (2006.01)
*A62B 18/04* (2006.01)
*B01D 46/00* (2006.01)
*A62B 18/08* (2006.01)

(52) U.S. Cl.
CPC ............ *A62B 18/084* (2013.01); *A62B 23/02* (2013.01); *B01D 46/0005* (2013.01); *B01D 46/009* (2013.01); *B01D 46/0095* (2013.01); *B01D 2279/40* (2013.01)

(56) References Cited

U.S. PATENT DOCUMENTS

| | | | |
|---|---|---|---|
| 2012/0174922 A1* | 7/2012 | Virr | A61M 16/0066 128/203.12 |
| 2013/0319408 A1* | 12/2013 | Zwolinsky | A62B 9/006 128/202.22 |
| 2015/0020801 A1* | 1/2015 | Frame | A61M 16/0057 128/202.22 |
| 2015/0023782 A1* | 1/2015 | Velzy | A61M 16/0066 415/119 |

FOREIGN PATENT DOCUMENTS

| | | |
|---|---|---|
| WO | 2011006206 | 1/2011 |
| WO | 2011123409 | 10/2011 |
| WO | 2013082649 | 6/2013 |

OTHER PUBLICATIONS

International Search Report of Application No. PCT/AU2016/050014 by Australian Patent Office, dated Feb. 23, 2016.

\* cited by examiner

FILTER ASSEMBLY FOR A BREATHING APPARATUS

CROSS REFERENCE TO RELATED APPLICATIONS

This application is a § 371 national stage of PCT International Application No. PCT/AU2016/050014 filed on Jan. 14, 2016, which claims priority to Australian Patent Application 2015900095, filed Jan. 14, 2015, the contents of each of these applications are incorporated herein by reference in their entireties.

TECHNICAL FIELD

The present invention relates to a filter assembly for filtering air, and in particular, relates to a filter assembly for a breathing apparatus, such as a powered air purifying respirator (PAPR).

BACKGROUND TO THE INVENTION

Breathing apparatus, such as powered air purifying respirators (PAPR), are generally used in polluted environments to provide filtered, non-toxic air to a wearer. A PAPR device typically comprises a flow generator for generating filtered air, and a mask for communicating the filtered air to the wearer. The flow generator typically comprises a powered impeller arranged to draw air from the atmosphere and a filter assembly including a filter element through which the air is passed and filtered. The filtered air is then conveyed to the wearer via the mask.

The filter assembly typically comprises a housing adapted to receive and retain one or more filter elements, and respective one or more filter elements. The filter elements are typically releasably engaged with the housing to allow replacement when an element is clogged or otherwise expired, or to allow one filter element to be substituted with another due to particular filtering characteristics of the filter element being most suitable for the environment the breathing apparatus is being used in. The filter assembly often further comprises a pivotable cover for accessing a recess in the housing into which the filter element is arranged, and covering the filter element when installed in the housing to prevent undesirable water ingress.

Breathing apparatus often utilise various different types of filter elements dependent on the ambient environment in which the breathing apparatus will be used. For example, the filter assembly may one or more of: a coarse filter; a pre-filter; a high efficiency particulate air (HEPA) filter; an advanced carbon filter; an activated carbon filter (steam activated or multiple chemical activated); a photo catalyst filter or coating (ambient light and/or LED activated); and/or a cold catalyst filter.

It is therefore critical to the function of the breathing apparatus, and potentially the health of the user, that a filter element is installed in the filter assembly, and may also be critical that the correct type of filter element able to provide particular filtering characteristics is installed. However, both of these requirements can prove problematic as the arrangement of a filter element in a breathing apparatus often means that it is difficult for a user to view the filter element and therefore determine if the filter element is present. It is also often inconvenient to determine whether the installed filter element is suitable for the environment the breathing apparatus will be used in, often requiring the filter element to be removed and inspected.

During use of such a breathing apparatus, it is also common for the filter element to become 'blocked', i.e. full of particulates and/or contaminants, and therefore unable to provide the filtered air to the user. Whilst conventional breathing apparatus often provide a 'filter blocked alarm' which is activated when the filter is fully blocked, such alarms are only activated when the filter is entirely blocked, meaning that a breathing apparatus can be unusable shortly after a user has fitted the apparatus and entered a polluted environment, which can further inconvenience the user.

Accordingly, it would be useful for a filter assembly, or a breathing apparatus including a filter assembly, to confirm to a user whether a filter element is installed in the filter assembly, and potentially also confirm the type and/or characteristics of the filter element, and/or how blocked or full of particulate the filter element is. Furthermore, it would be useful to provide a solution that avoids or ameliorates any of the disadvantages present in the prior art, or which provides an alternative to prior art approaches.

SUMMARY OF THE INVENTION

According to one aspect of the invention, there is provided a filter assembly for a breathing apparatus, the filter assembly comprising a frame defining an aperture dimensioned to receive and retain a filter element, a cover connected to the frame and dimensioned to cover the aperture, a filter element, and an indicator for indicating when the filter element is retained in the filter frame and the cover is arranged across the aperture.

Other aspects are disclosed.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

The present disclosure relates to a filter assembly for a breathing apparatus, the filter assembly comprising a frame defining an aperture dimensioned to receive and retain a filter element, a cover connected to the frame and dimensioned to cover the aperture, a filter element, and an indicator for indicating when the filter element is retained in the filter frame and the cover is arranged across the aperture.

The disclosed filter assembly is configurable to provide a clear visual and/or audio indication to confirm whether the filter element is installed in the filter frame. This is advantageous, as this allows a user to readily determine whether the filter element is present, when it is hidden from view underneath the cover. Failure to install a filter element and using the breathing apparatus could cause adverse health effects for the user, and therefore the filter assembly provides a significant safety feature in the breathing apparatus which decreases the likelihood of this occurring.

When the filter assembly is used with a powered breathing apparatus, the filter assembly may also cause the breathing apparatus to be non-operational when the indicator is operated, therefore further enhancing the safety aspect of the filter assembly.

Figure 1A:
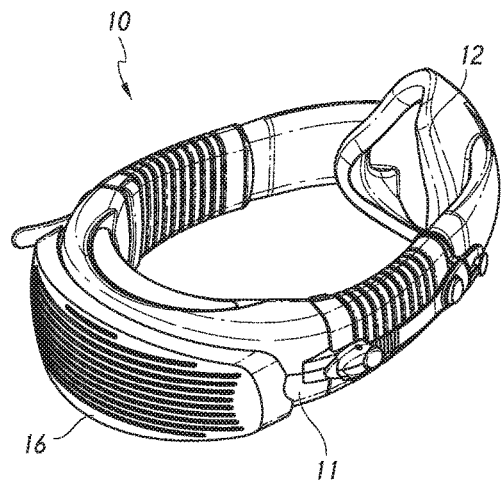
FIGS. 1A & 1B are perspective views of a breathing apparatus including a filter assembly.
Figure 1B:
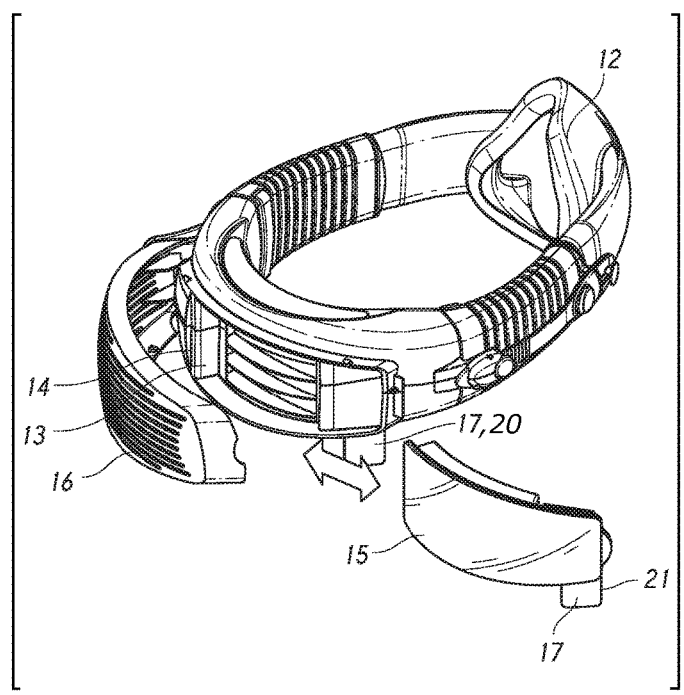

The filter assembly may also include wireless communication means configured to communicate data between the filter element and the filter frame. This is particularly useful where many different types of filter elements are likely to be installed in the breathing apparatus depending on its usage environment, as the data can allow the apparatus to readily identify the type of filter element and its properties/filtering characteristics, and other useful information, such as its expiry date. The data therefore allows the breathing apparatus to determine whether to function, and also communicate information to the user. FIGS. 1A & 1B show a breathing apparatus 10 for providing filtered air to a user, the breathing apparatus comprising a neck component 11 connected to a mask 12. The neck component houses a flow generator (not shown) and a filter assembly 13. The filter assembly 13 includes a frame 14 dimensioned to receive and retain a filter element 15, a filter element 15, a cover 16 pivotably connected to the frame 14, and an indicator 17, The cover 16 defines one or more apertures to allow air to travel therethrough and is dimensioned to enclose the filter element when pivoted against the frame 14. The cover 16 is typically shaped to deflect liquid and/or light away from the filter element 15 retained in the frame 14, which can damage or degrade the filter element 15. The indicator 17 is connected to at least one of the frame 14 and filter element 15 and typically arranged to be visible when the cover 16 is pivoted against the frame 14.

The flow generator is configured to draw unfiltered air from outside of the breathing apparatus 10 and through the filter assembly 13, causing the filter assembly 13 to filter the unfiltered air. The flow generator then conveys the filtered air to the mask 12 to allow inhalation thereof by the user.

The filter assembly 13 is adapted to receive and retain one or more filter elements 15. Each filter element 15 may be replaced by pivoting the cover 16 away from the frame 14 and removing the filter element 15 therefrom.

The indicator 17 may comprise a tab 20, 21 extending from one or both of the frame 14 and filter element 15. Each tab 20, 21 is arranged to extend from the respective component 14, 15 beyond a periphery of the cover 16. Where a single tab is employed, for example, extending from the filter element 15 only, the tab 21 includes colour, text and/or indicia to indicate the filter element 15 is present. For example, the tab 21 may be coloured bright green, thereby allowing a user to rapidly confirm whether the filter element 15 is installed in the breathing apparatus 10. The tab 21 may also include colour, text or indicia to indicate the filtration characteristics of the filter element 15.

Alternatively, where two tabs are employed, the tab 20 extending from the frame 14 indicates the filter element 15 is not present, and the tab 21 extending from the filter element 15 indicates the filter element 15 is present. In this arrangement, the tab 21 extending from the filter element 15 is arranged to overlay and substantially cover the tab 20 extending from the frame 14 in order to hide the 'filter not present' tab 20 when the filter element 15 is installed in the frame 14.

Figure 2:
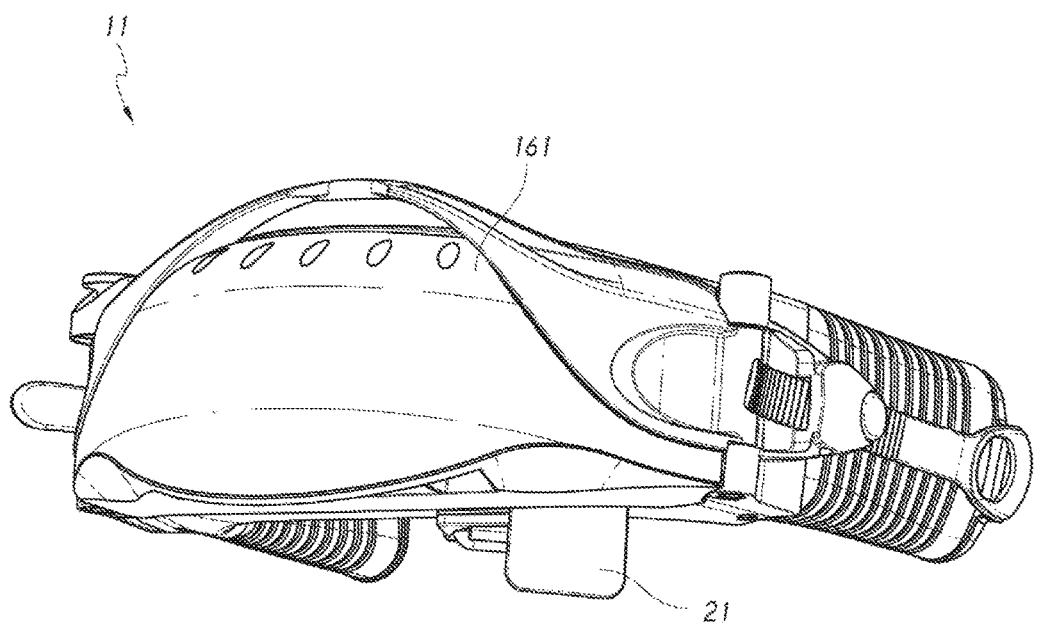
FIG. 2 is an alternative perspective view of part of the breathing apparatus shown in FIG. 1A.

In FIG. 2, the neck component 11 is shown in isolation having an alternative cover 161 connected thereto and pivoted against the filter frame 14 (not visible). The filter element 15 (also not visible) is installed in the frame 14, indicated by the tab 21 extending therefrom and below the cover 161.

Figure 3A:
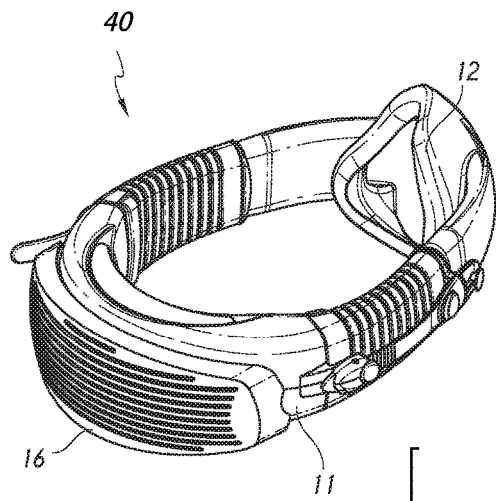
FIGS. 3A & 3B are perspective views of an alternative breathing apparatus including an alternative filter assembly.
Figure 3B:
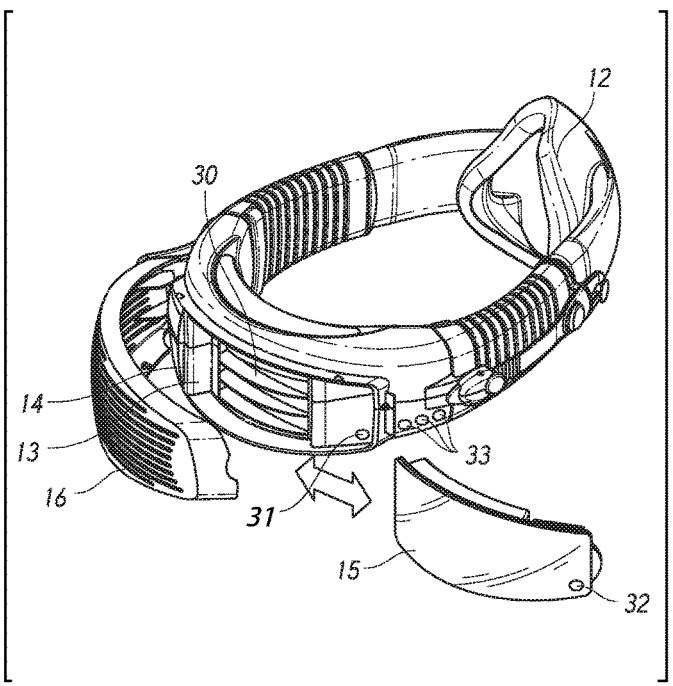

FIGS. 3A & 3B show an alternative breathing apparatus 40 sharing many of the features of the breathing apparatus 10, whereby common reference numerals indicate shared features. The breathing apparatus 40 includes an alternative filter assembly 30 comprising an electronic indicator system. The indicator system comprises a sensor 31 for detecting the presence of a filter element 15 attached to the frame 14. The filter element 15 may also comprise detection means 32 configured to be detected by the sensor 31. The system further comprises one or more indicators 33 operable responsive to the sensor 31 detecting the presence of the filter element 15. The indicators may include one or more of a visual or audio indicator, such as an LED and/or buzzer, thereby emitting a visual and/or audio signal responsive to the presence of the filter element.

The electronic indicator system may be configured to operate the indicators 33 responsive to the filter element 15 being present or not present. For example, the indicators 33 may be LEDs, and be operated, i.e. illuminated, until a filter element 15 is installed in the filter frame 14 and detected by the sensor 31. Similarly, the indicators 33 could be operated in a first mode, for example, emitting a red light, until a filter element 15 is installed in the filter frame 14 and detected by the sensor 31, causing the indicators 33 to be operated in a second model and, for example, emit a green light.

The sensor 31 may be configured as a magnetic sensor and the detection means 32 comprise one or more magnets. Where a plurality of magnets are employed, for example, four magnets arranged in a pattern, the presence or absence of the magnets is useful for communicating to the breathing apparatus 40 data, such as the type of filter element 15 installed in the frame 14, or its expiry date.

Alternatively, the sensor 31 may be substituted for a wireless signal receiver, such as a radio frequency identification (RFID) reader, and the detection means 32 may be substituted for a wireless signal transmitter, such as an RFID module (commonly known as an RFID 'tag'). In this embodiment, more complex data can be communicated between the filter element 15 and the breathing apparatus 40, such as filtration characteristics of the filter element 15, such as contaminants able to be filtered, e.g. ammonia, acid gasses, organic gasses, the starting flow resistance of the element 14, the blocked flow resistance of the element 15, element 15 expiry date, and/or filter element 15 part number/serial number/batch code. Where starting (clean) flow resistance and blocked flow resistance data is communicated to the breathing apparatus 40, this is particularly useful as this allows the apparatus 40, using an integrated pressure sensor, to dynamically determine how blocked the filter element 15 is, i.e. 30% blocked, and affect the operation of the breathing apparatus 40 and/or indicator 33 accordingly. For example, the indicator 33 may include an LCD screen which displays the 'percentage blocked' of the filter 15, thereby allowing a user to monitor this status.

The apparatus 40 and/or filter assembly 30 may further comprise a processor (not shown) thereby allowing the processor to determine, from the communicated data, whether the filter element 15 is suitable, for example, for a predefined usage environment of the breathing apparatus 40, and therefore whether to allow the apparatus 40 to operate, and also whether and how the indicator 33 should operate. For example, the wireless communicated data may indicate the filter element 15 is suitable for the intended environment of the apparatus 40 but is near the expiry date, therefore causing the indicator to emit a green light and flash rapidly, indicating the filter element 15 is usable but should be replaced soon.

Furthermore, the wirelessly communicated data may be used to determine if the filter element 15 is an authentic filter 15 which is compatible with the breathing apparatus 40, and therefore affect apparatus 40 and indicator 33 operation accordingly.

It will be appreciated that the wireless communication between filter element 15 and filter assembly 30 and/or breathing apparatus 40 can be any suitable wireless protocol such as RFID or near field communication (NFC).

Figure 4:
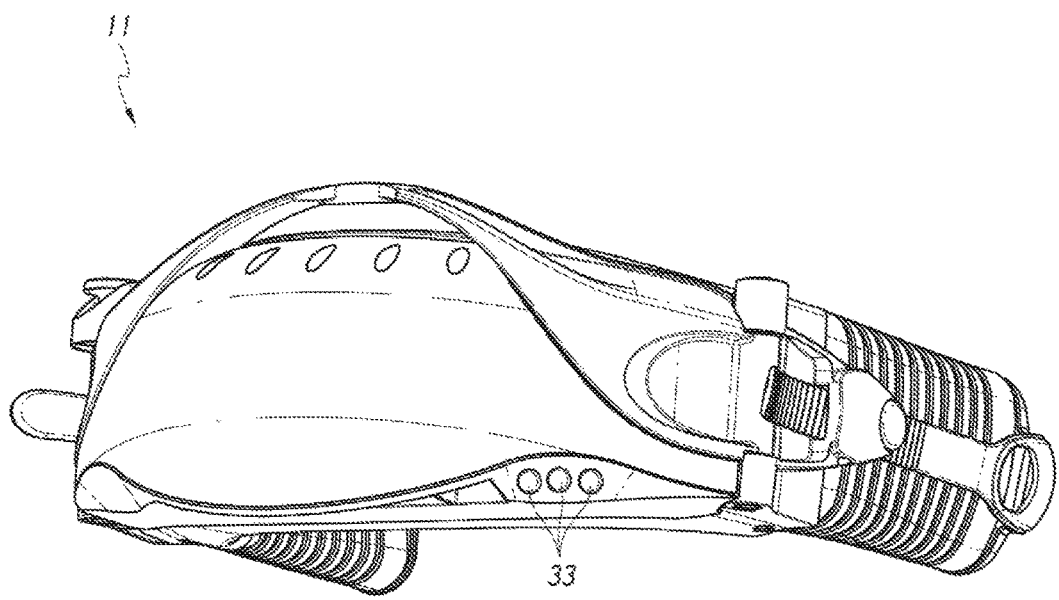
FIG. 4 is an alternative perspective view of part of the breathing apparatus shown in FIG. 3A.

FIG. 4 shows the neck component 11 in isolation having an alternative cover 161 connected thereto and pivoted against the filter frame 14 (not visible). The filter element 15 (also not visible) is installed in the frame 14, indicated by the indicators 33, configured as LEDs, arranged below the cover 161 being illuminated.

Whilst the invention is described above with reference to specific embodiments, it will be appreciated that it is not limited to those embodiments and may be embodied in other forms.

The invention claimed is:

1. A filter assembly for a breathing apparatus, the filter assembly comprising:
   a frame defining an aperture dimensioned to receive and retain a filter element;
   a cover connected to the frame and dimensioned to cover the aperture;
   a filter element; and
   an indicator for indicating when the filter element is retained in the filter frame and the cover is arranged across the aperture, the indicator including a tab extending from each of the filter frame and the filter element;
   wherein one of the tabs is arranged to overlay and substantially cover the other tab when the filter element is retained in the filter frame.

2. The filter assembly according to claim 1, wherein the indicator is arranged to be visible from outside the filter assembly when the cover is arranged across the aperture.

3. The filter assembly according to claim 1 wherein the at least one tab includes at least a portion comprising colour or indicia.

4. The filter assembly of claim 1, wherein the frame further comprises a sensor for detecting the filter element being retained in the aperture, and wherein responsive to detecting the filter element, the indicator is operated.

5. The filter assembly according to claim 4, wherein the indicator comprises at least one of a light source and an audio generator.

6. The filter assembly according to claim 4, wherein the filter element further comprises a detection element configured to be detected by the sensor.

7. The filter assembly according to claim 6, wherein the detection element is a magnet and the sensor is a magnetic sensor.

8. The filter assembly of claim 1, wherein the frame further comprises a sensor for detecting the filter element being retained in the aperture, and wherein the indicator is operated until the sensor detects the filter element.

9. A powered breathing apparatus including the filter assembly according to claim 8, wherein responsive to operation of the indicator, the breathing apparatus is prevented from being operated.

10. The filter assembly according to claim 8, wherein the indicator comprises at least one of a light source and an audio generator.

11. The filter assembly according to claim 8, wherein the filter element further comprises a detection element configured to be detected by the sensor.

12. The filter assembly according to claim 1, wherein the filter frame further comprises a wireless signal receiver;
    the filter element further comprises a wireless signal transmitter; and
    the indicator is operated responsive to receiving wireless communication between the filter element and filter frame.

13. The filter assembly according to claim 12, wherein the indicator is operable in two modes; and
    the assembly further comprises a processor configured to authenticate the wireless communication and operate the indicator in a first mode when an authenticated communication is identified and a second mode when a non-authenticated communication is identified.

14. A powered breathing apparatus including the filter assembly according to claim 12, wherein responsive to operation of the indicator, the breathing apparatus is prevented from being operated.

15. A breathing apparatus comprising:
    a mask, adapted to substantially surround at least one of a mouth and nostrils of a user; and
    a neck component attached to the mask and adapted to substantially surround a neck of the user, the neck component including a filter assembly in accordance with claim 1 and a flow generator, whereby the flow generator receives unfiltered air from outside of the breathing apparatus, conveys the unfiltered air through the filter assembly to filter the unfiltered air, and conveys the filtered air to the mask.

* * * * *